L. E. BAGWELL.
GEAR CUTTING ATTACHMENT FOR MILLING MACHINES.
APPLICATION FILED JAN. 2, 1913.
1,080,094.
Patented Dec. 2, 1913.
4 SHEETS—SHEET 1.
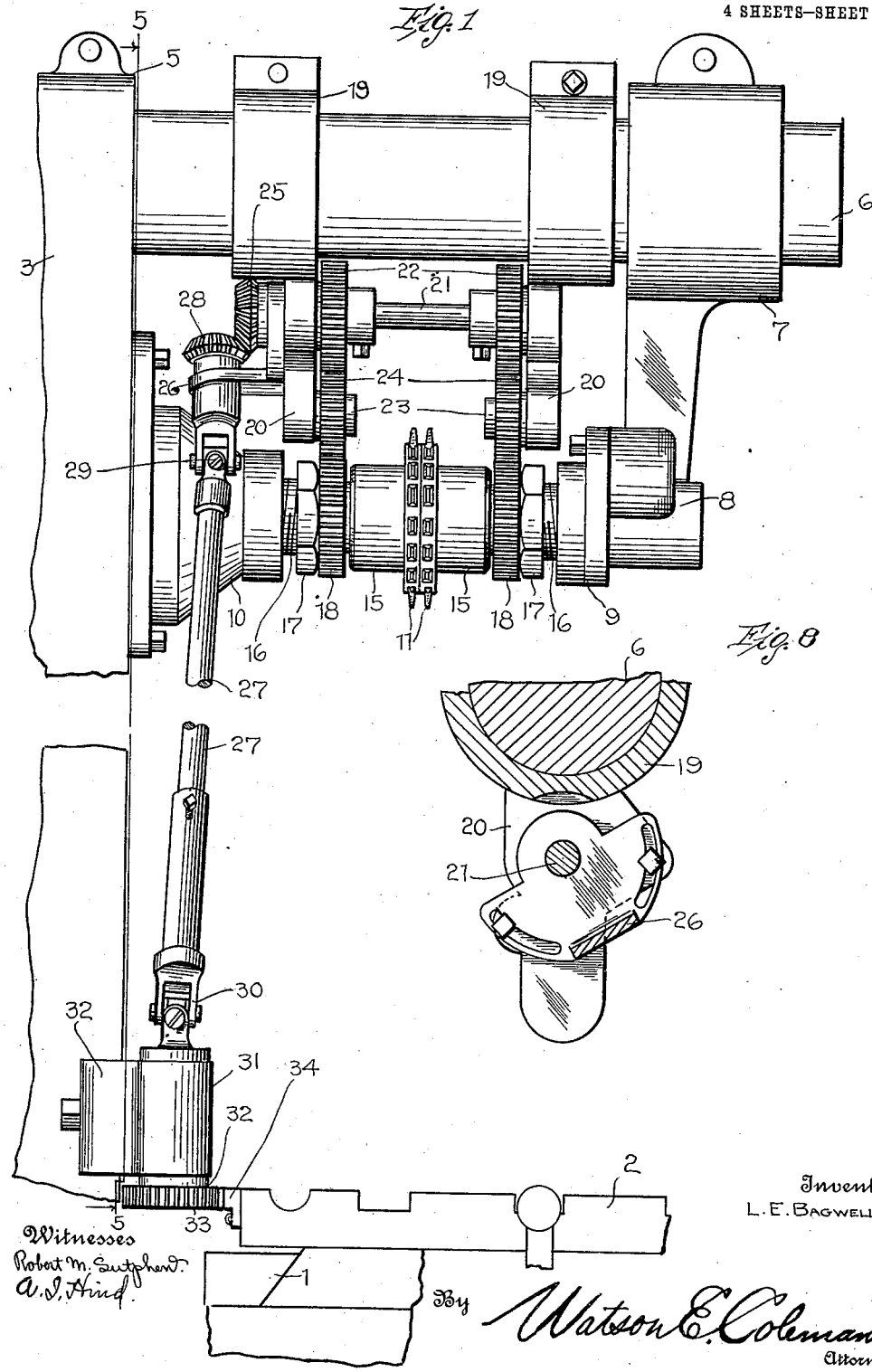
Inventor
L. E. BAGWELL
Witnesses
Robert M. Sutphen
A. J. Hind
By Watson E. Coleman,
Attorney

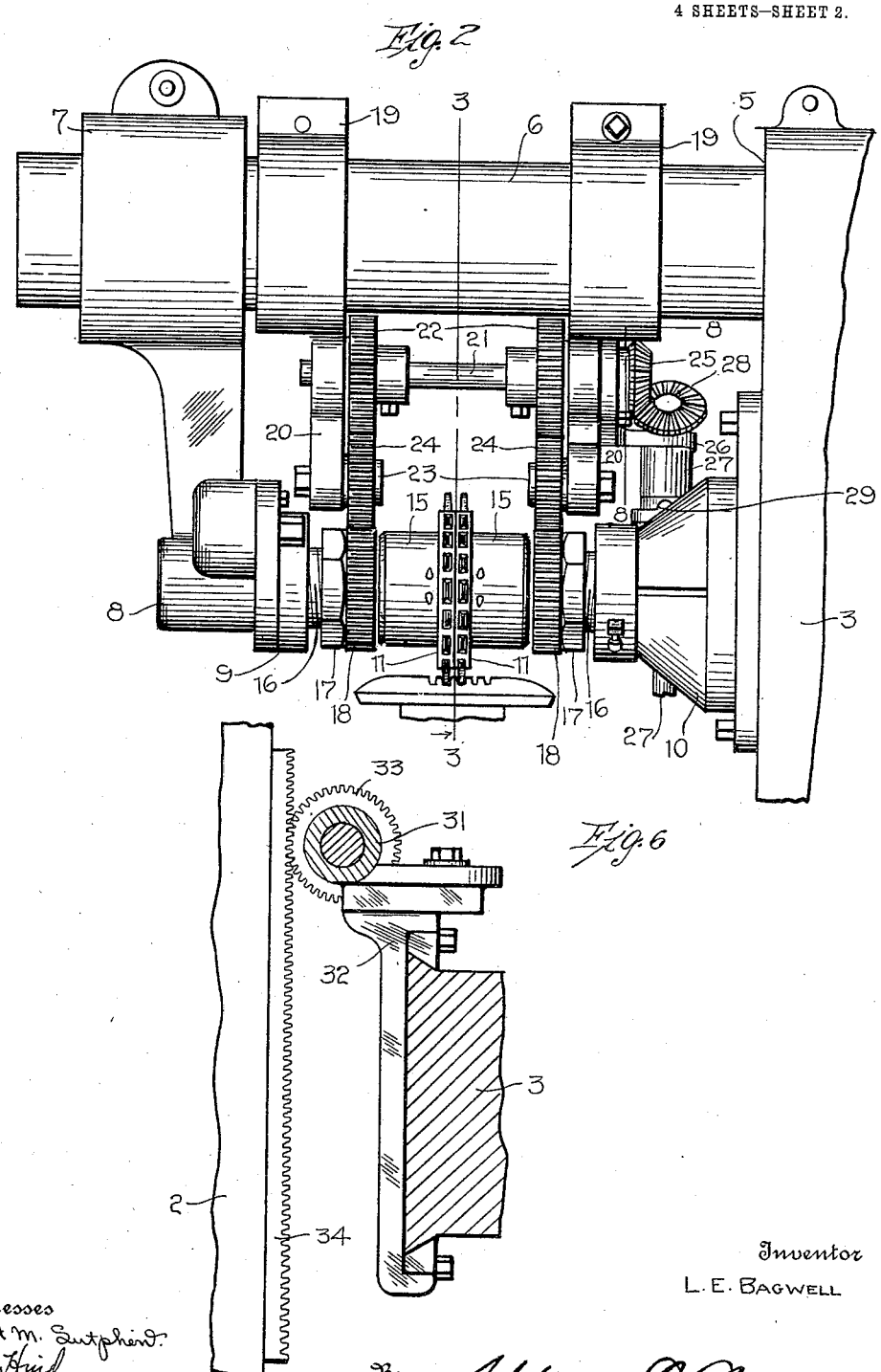

L. E. BAGWELL.
GEAR CUTTING ATTACHMENT FOR MILLING MACHINES.
APPLICATION FILED JAN. 2, 1913.
1,080,094.
Patented Dec. 2, 1913.
4 SHEETS—SHEET 3.
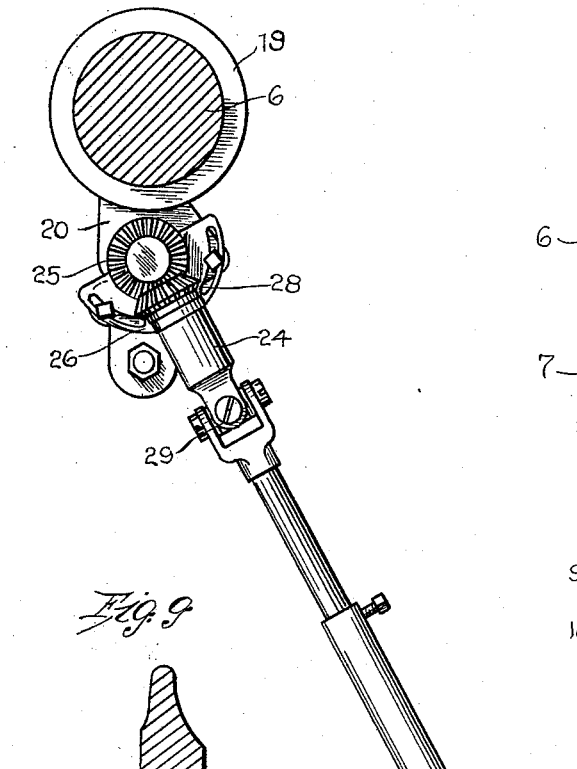
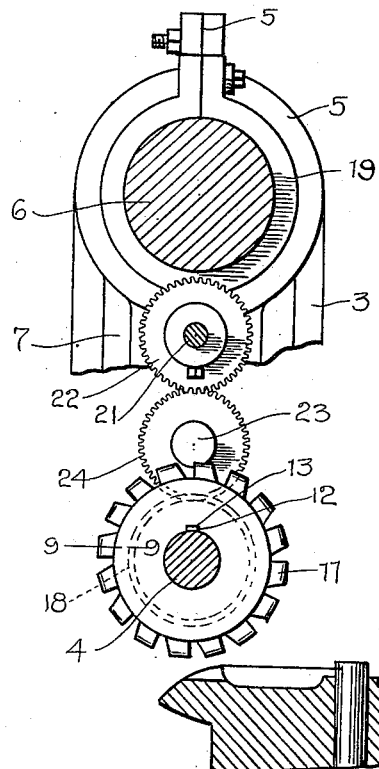
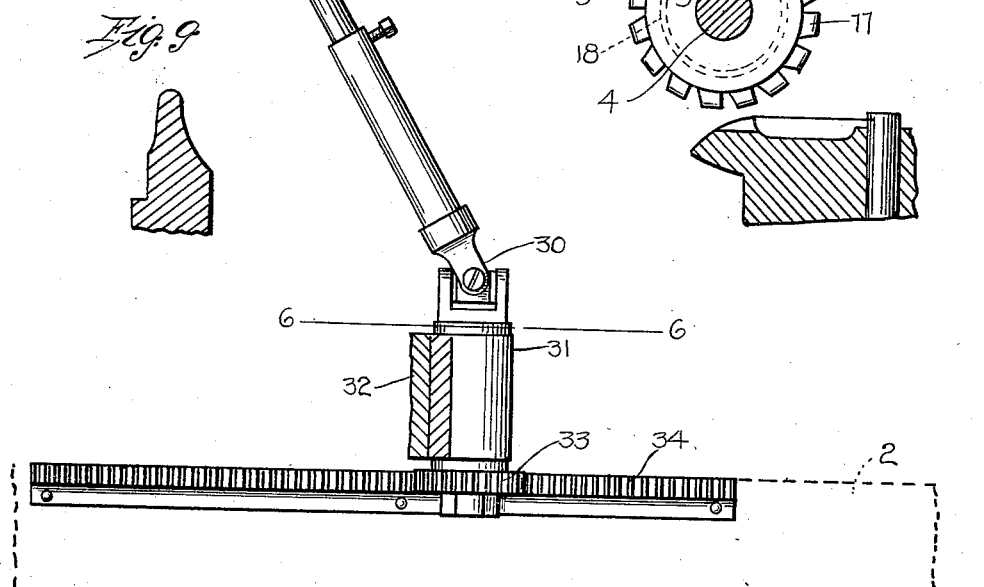
Witnesses
Robert M. Sutphen
A. J. Hind
Inventor
L. E. BAGWELL
By Watson E. Coleman,
Attorney
COLUMBIA PLANOGRAPH CO., WASHINGTON, D. C.

L. E. BAGWELL.
GEAR CUTTING ATTACHMENT FOR MILLING MACHINES.
APPLICATION FILED JAN. 2, 1913.

1,080,094.

Patented Dec. 2, 1913.

4 SHEETS—SHEET 4.

Witnesses:
Robert M. Sutphen.
A. I. Hind.

Inventor
L. E. Bagwell

By Watson E. Coleman
Attorney

UNITED STATES PATENT OFFICE.

LANDRUM EARL BAGWELL, OF HARTSVILLE, SOUTH CAROLINA.

GEAR-CUTTING ATTACHMENT FOR MILLING-MACHINES.

1,080,094.  Specification of Letters Patent.  Patented Dec. 2, 1913.

Application filed January 2, 1913. Serial No. 739,915.

*To all whom it may concern:*

Be it known that I, LANDRUM E. BAGWELL, a citizen of the United States, residing at Hartsville, in the county of Darlington and State of South Carolina, have invented certain new and useful Improvements in Gear-Cutting Attachments for Milling-Machines, of which the following is a specification, reference being had to the accompanying drawings.

This invention relates to new and useful improvements in milling machines and more particularly to a gear cutting attachment for milling machines and my object is to provide a device of this character which will cut a complete tooth of a bevel gear on each cutting stroke of the carriage or what may be termed each "cut" of the device.

A further object of the invention resides in providing a pair of cutters adapted to act simultaneously upon the gear blank to form the teeth thereon and a still further object resides in providing means for the movement of said cutters with respect to one another during the operation thereof.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

Figure 4:
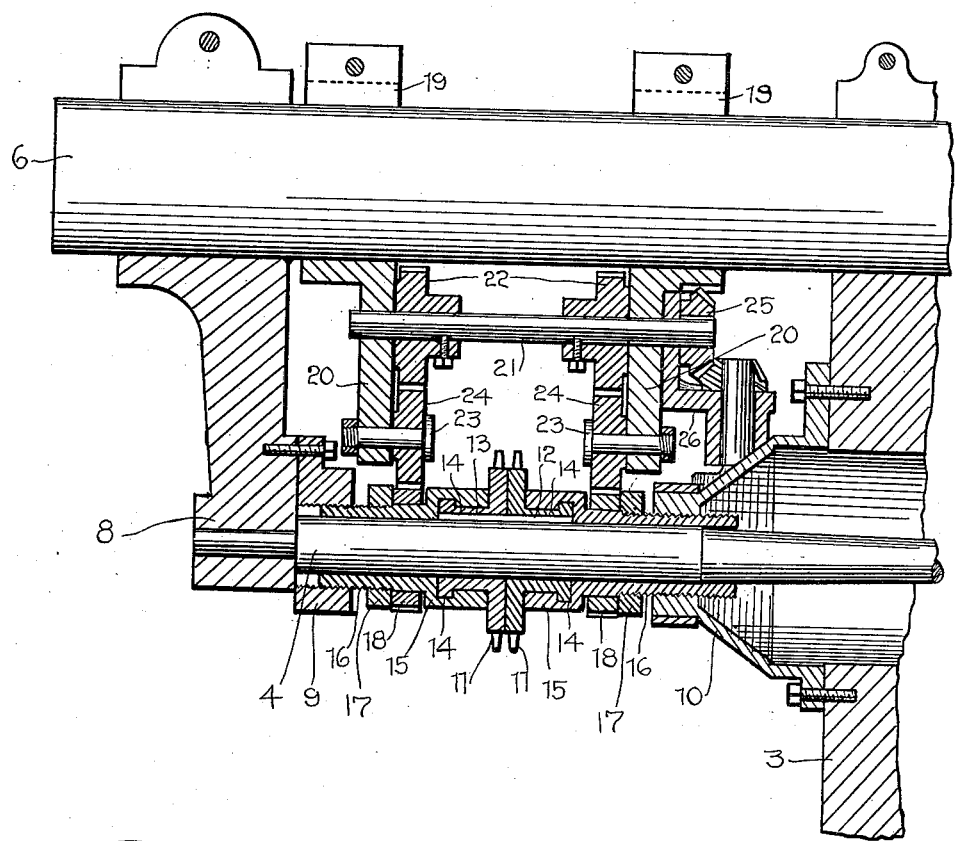
Figure 7:
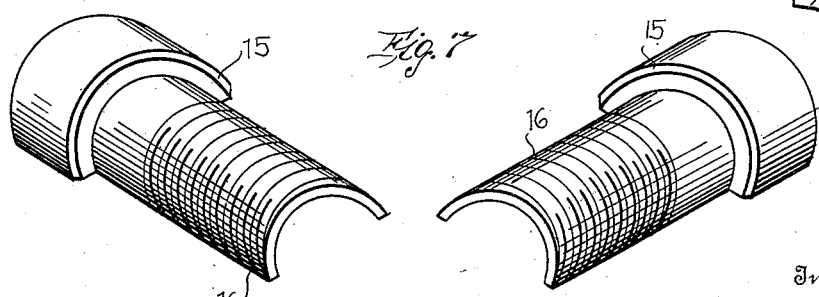

In the accompanying drawings Figure 1 is a fragmentary front elevation of a milling machine showing my improved gear cutting attachment applied thereto. Fig. 2 is a rear elevation thereof. Fig. 3 is a vertical section therethrough as seen on line 3—3, Fig. 2. Fig. 4 is a vertical transverse section through the machine having my improved attachment applied to use thereon. Fig. 5 is a vertical section as seen on line 5—5, Fig. 1. Fig. 6 is a horizontal section as seen on line 6—6, Fig. 5. Fig. 7 is a perspective view of sections of the respective sleeve-like members removed from the arbor. Fig. 8 is a vertical section as seen on line 8—8, Fig. 2; and Fig. 9 is a section through the cutter as seen on line 9—9, Fig. 3.

In describing my invention, I shall refer to the drawings in which similar reference characters designate corresponding parts throughout the several views and in which—

1 indicates the bed of a milling machine of the usual or any preferred type, having a carriage 2 adjustably mounted thereon and the upright portion 3 of the machine has the arbor 4 rotatably mounted therein above the carriage and adapted for rotation in the usual or any preferred manner. Mounted in bearings 5 formed in the upper portion of the upright 3, is the usual enlarged sliding shaft 6, which carries thereon the usual supporting arm 7, the lower free end of which has a bearing 8 formed therein to receive the outer end of the arbor 4.

Secured on the inner face of the arm 7, is a casting 9, which has an enlarged threaded opening therein through which the arbor 4 extends and also secured on the side of the upright, adjacent the bed of the machine, is an additional and larger casting 10. This latter casting is somewhat frusto-conical in design and also has an enlarged threaded opening therein through which the arbor 4 is disposed.

Loosely mounted on the arbor 4, is a pair of rotary cutters 11, said cutters being capable of rotation with said arbor through the medium of a key 12 on the latter, which fits in slots 13 on the inner peripheries of said cutters. Each of these cutters 11 has a hub like portion formed thereon, each hub having an annular flange 14 formed at its outer end and revolubly mounted on the arbor 4, for engagement on the hub portions of the cutters, are the sectional sleeves 15. The portion of each sleeve which is locked about the hub of a cutter, is somewhat enlarged, forming a shoulder on each sleeve and the reduced portion thereof has the greater portion of the same threaded, as shown at 16 to be engaged with a nut 17. The portion of each sleeve between the referred to shoulder and the threaded portion 16, receives thereon a gear 18, which is locked in place by the lock nut 17, said nut also locking the sections of the sleeve on the arbor and on the hub portion of the cutter. The threaded portions of the sleeves 15 which extend beyond the nuts 17, are engaged with the threaded openings of the respective castings 9 and 10 and it must be here stated that these openings are threaded oppositely, the one being a left hand thread and the other a right hand thread. From this construction, it will be seen that as the arbor is rotated, the cutters 11 will be rotated therewith, without affecting the sleeves 15 and the gears 18 thereon, but upon the rotation of said gears 18, the sleeves carrying the cutters will be moved longitudinally in opposite directions on the arbor, toward or away from one another, as the case may be. I have provided for the rotation of these gears 18 and to this end, I provide a pair of clamping brackets 19 which are engaged with the enlarged shaft 6, in spaced relation with one another. Each of these clamping brackets 19 is provided with a dependent arm 20, which rotatably support, adjacent their upper ends, a shaft 21, and removably secured to said shaft, is a pair of pinions 22. These pinions 22 are disposed on the inner faces of the arms 20 and rotatably mounted on stub shafts 23, adjacent the lower ends of the arms 20, are the additional pinions 24, which mesh with the pinions 22 and also mesh with the pinions 18 carried on the sleeves 15.

The one end of the shaft 21, extends beyond the one dependent arm 20 and has a bevel gear 25, secured thereon, and adjustably secured on the last mentioned dependent arm 20 is a swinging angular sleeve-like bearing 26. A shaft 27, which extends through this bearing 26, has an additional bevel gear 28 mounted on the upper end thereof in mesh with the aforesaid bevel gear 25. This shaft 27 is extensible and is provided with a pair of universal knuckles 29 and 30 in the length thereof, the lower extreme end of said shaft being disposed through a vertical bearing 31 which is formed in a clamping bracket 32. This clamping bracket is adjustably secured to the side of the upright 3, adjacent the bed 1 of the machine and in this instance is in a plane above the plane of the carriage 2. The extreme lower end of the shaft 27 which is disposed below the bearing 31 has a pinion 33 secured thereon, the teeth of which are disposed in mesh with a rack bar 34, which is carried on the inner side edge of the carriage 2. Thus as the carriage is moved backwardly and forwardly, the shaft 27 will be rotated and through the various means heretofore described, the cutters 11 will be moved longitudinally on the arbor 4, with respect to one another, thereby forming inclined cuts or channels in the work engaged therewith. The adjustment of these cutters with respect to one another, may be governed entirely by the size of gear 33 which is used.

This invention, as stated previously, is adapted for use on milling machines for the formation of teeth on bevel gears, the device being designed to form a pair of cuts or channels in the work simultaneously, thereby forming a complete tooth at each cutting stroke of the carriage. As the teeth on the bevel gears are wider at one of their ends than at the other, it is obvious that with the use of a pair of cutters, some means must be provided for the longitudinal movement of the cutters during the operation of the device. This invention contemplates a means for accomplishing this result referred to and from the above description of the construction of the device, the operation thereof for the purpose of accomplishing this result will be readily understood.

From the foregoing it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to within the scope of the appended claims without departing from the spirit or sacrificing any of the principles of the invention.

Having thus described this invention, what I claim is:—

1. In a gear cutting machine, the combination with a longitudinally reciprocating carrier; of a transversely extending rotating arbor disposed thereabove, a pair of sleeve members loosely mounted on said arbor and capable of longitudinal movement thereon with respect to one another, a pair of cutters respectively connected to said sleeve members, said cutters being keyed to said arbor and rotatable with the latter independent of said sleeve members, and means in connection with said carrier and said sleeve members for moving the latter and correspondingly said cutters longitudinally on said arbor upon the reciprocation of said carrier.

2. In a gear cutting machine, the combination with a longitudinally reciprocating carrier; of a transversely extending rotatable arbor disposed thereabove, a pair of spaced and stationarily mounted bearings through which said arbor is disposed, the inner peripheries of said bearings being oppositely threaded, a pair of sleeve members loosely applied to said arbor and having portions thereon oppositely threaded to engage respectively the threaded portions of said bearings, a pair of cutters keyed to said arbor for rotation with the latter, said cutters also having loose connection with said sleeve members, and means in connection with said carrier and said sleeve members for the rotation of the latter upon the reciprocation of the former, whereby said sleeve members and cutters connected therewith will be moved longitudinally with respect to one another on the arbor.

3. In a gear cutting machine, the combination with a longitudinally reciprocating carrier; of a transversely extending rotatable arbor disposed thereabove, a pair of spaced and stationarily mounted bearings through which said arbor is disposed, the inner peripheries of said bearings being oppositely threaded, a pair of cutters keyed to said arbor for rotation therewith, each of said cutters being provided with a hub-like portion having an annular flange at the outer end thereof, a pair of sectional sleeve-like members loosely applied to the arbor and having portions thereof respectively interlocked with the hub-like portions of said cutters, said sleeve-like members having portions thereof oppositely threaded to engage the oppositely threaded portions of said bearings, means applied to said sleeve-like members for retaining the sections thereof together and correspondingly locking the same in engagement with the hub-like portions of said cutters, and means for rotating said sleeve-like members upon the reciprocation of said carrier, whereby the former and correspondingly the cutters carried thereby will be moved longitudinally with respect to one another on the arbor.

4. In a gear cutting machine, the combination with a longitudinally reciprocating carrier; of a transversely extending and rotatable arbor disposed thereabove, a pair of stationarily mounted and spaced bearings through which said arbor is disposed, the inner peripheries of said bearings being oppositely threaded, a pair of cutters keyed to said arbor for rotation therewith, each of said cutters being provided with a hub-like portion having an annular flange on the outer end thereof, a pair of sleeve-like members applied to said arbor and having portions thereof interlocked with the hub-like portions of said cutters, each of said sleeves being formed in sections and having portions thereof oppositely threaded, a gear applied to each of said sleeve-like members to retain the sections thereof together and in loosely locked engagement with the hub-like portions of said cutters, means applied to the threaded portions of said sleeve-like members for locking the gears in position thereon, the remaining threaded portions of said sleeve-like members being respectively engaged with the aforesaid threaded bearings, and means in connection with said reciprocating carrier and the gears on said sleeve-like members for rotating the latter upon the reciprocation of the former, whereby said sleeve-like members and cutters engaged therewith will be moved longitudinally with respect to one another on said arbor as the carrier is reciprocated.

In testimony whereof I hereunto affix my signature in the presence of two witnesses.

LANDRUM EARL BAGWELL.

Witnesses:
J. B. STANLEY,
HOMER BETHEA.

Copies of this patent may be obtained for five cents each, by addressing the "Commissioner of Patents, Washington, D. C."